March 5, 1968     M. H. NORWALK     3,371,993
METHOD OF MAKING MAGNESIUM OXIDE FIBERS
Filed Dec. 21, 1964
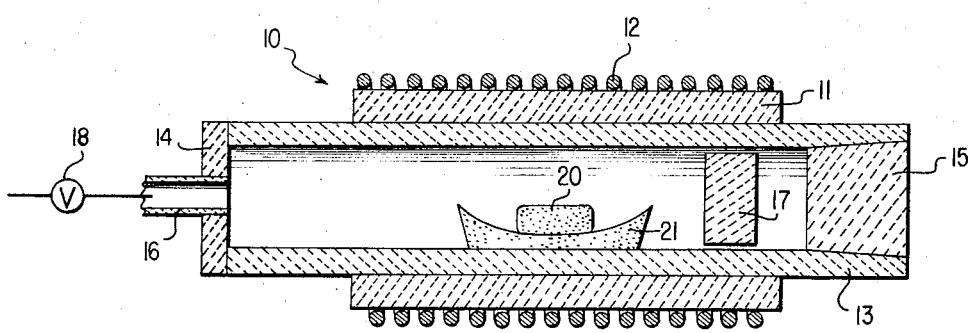
INVENTOR.
MARSHALL H. NORWALK
BY Sughrue, Rothwell, Mion,
Zinn and Macpeak
ATTORNEYS.

United States Patent Office 3,371,993
Patented Mar. 5, 1968

3,371,993
METHOD OF MAKING MAGNESIUM OXIDE FIBERS
Marshall H. Norwalk, Watkins Glen, N.Y., assignor to Corning Glass Works, Corning, N.Y., a corporation of New York
Filed Dec. 21, 1964, Ser. No. 419,970
12 Claims. (Cl. 23—201)

ABSTRACT OF THE DISCLOSURE

Fibrous crystalline magnesium oxide is produced by reacting aluminum and magnesium oxide at a temperature of at least 1300° C. to form magnesium metal vapor which is further reacted with oxygen to form the fibrous product.

The present invention relates to small diameter fibers or whiskers of magnesium oxide and to methods for their manufacture.

The formation of magnesia whiskers has been reported by Hulse, Journal of American Ceramic Society, vol. 44, 1961, pp. 572–575. These whiskers, which are from 1 to 3 microns in diameter and of lengths up to about 700 microns, can have strengths of the order of millions of pounds per square inch. Hulse formed these whiskers by the compressive deformation of single crystals at room temperature.

Because of their strength, magnesium oxide whiskers may be used as fillers in strengthening materials such as plastics and metals. In the form of dense fibrous mats, they can provide a high temperature insulating material. In order to make the use of magnesium oxide whiskers commercially feasible, a method for their production, which is suitable for use on a large scale, from readily available materials must be provided.

The primary object of the present invention is the provision of an efficient method for producing small diameter fibers or whiskers of magnesium oxide. A related object is the provision of small diameter magnesium oxide fibers.

In general, the present invention comprises reducing magnesium oxide by reaction with aluminum metal to produce vapors of magnesium metal and then reacting the magnesium metal vapors with oxygen to form solid magnesium oxide whiskers.

The invention also comprises the magnesium oxide fibers produced according to the foregoing method. The products are needle-like, solid, crystalline fibers of magnesium oxide having a length of up to about 1.5 inches and a diameter of up to about 25 microns. The products also include aggregates of such fibers in the form of cotton or fur-like mats.

In its preferred form, the invention comprises mixing powdered aluminum and powdered magnesium oxide. The mixture may first be dry pressed or hot pressed to form aggregates or compacts. A pellet produced in this manner is then heated in a suitable furnace to a temperature at which the reduction of the magnesium oxide by the aluminum is initiated.

The reduction reaction may be conducted in a substantially inert atmosphere, such as nitrogen or argon gas, or in the presence of a source of oxygen, depending on the condition of the reactants. Where the reactants are treated as a loose mixture or a lightly pressed compact, the atmosphere should be substantially inert during the reduction reaction to prevent premature formation of alumina, before the aluminum metal has reduced the magnesium oxide. However, densely compacted mixtures or granules produced by grinding dense, hot-pressed pellets effectively exclude atmospheric gases and may therefore be reacted in an oxygen containing environment without detriment.

The magnesium metal vapors are then reacted with oxygen to form magnesium oxide whiskers. Where the reduction is conducted in an oxygen containing atmosphere, the formation of magnesium oxide whiskers proceeds directly as the magnesium metal vapors are formed. Where an inert atmosphere is employed, a source of oxygen must be brought into contact with the magnesium metal vapors to generate the whiskers.

The source of oxygen may conveniently be provided by air, oxygen-enriched air, water vapor or the like.

The initial phase of the process, the reduction of magnesium oxide by aluminum, proceeds at temperatures of about 1300° C. and above. This temperature is satisfactory where the reactants are in the form of hot-pressed, dense pellets or compacts of the reactant powders, whether in an oxygen containing or an inert environment. However, for reactants in the form of low density, porous compacts or loose powder mixtures, a temperature of about 1450° C. or above and an inert atmosphere are generally required.

Where an inert atmosphere is employed, oxygen may be supplied by permitting small amounts of an oxygen containing gas, such as air, to flow into the reactor to react with the magnesium vapors. This may be done by flushing the reactor with an inert gas at such a low flow rate that oxygen or air is allowed to "back diffuse" into the reaction chamber and that the magnesium vapors products are not expelled from the chamber. The oxygen in this small volume of air is sufficient to complete the reaction. An alternative method of supplying the necessary oxygen is to discontinue the flow of inert gas into the reaction chamber just prior to introducing the reactants. When the reactants are introduced into the chamber, an amount of oxygen sufficient to react with the magnesium metal vapors will also be admitted. It is also possible to employ as the reaction atmosphere a stream of inert gas containing water vapor. The water vapor provides oxygen which will combine with the magnesium vapors to form the desired magnesium oxide whiskers.

No particular proportions of aluminum metal, magnesium oxide or oxygen are necessary. Any reactant which is present in excess will merely remain unreacted or will react to form harmless by-products.

In the present specification and claims, the term "magnesium oxide whiskers" refer to fine, solid, needle-like structures of magnesium oxide. Three general types of whisker growth are observed as a result of the reaction. Some of the whiskers are large, individual needles having a diameter of up to about 25 microns and a length of up to 1.5 inches. Random mats of whiskers generally having a diameter of about 1 micron or less are also produced and these mats have the appearance of surgical cotton. In addition, oriented mats or "fur" of extremely small diameter whiskers are formed.

It is believed that the nature of the present invention will be more fully appreciated in the light of the following detailed description and specific examples and by reference to the accompanying drawing.

In the drawing:

The figure is a side cross-sectional view of a typical apparatus in which the present invention may be carried out.

In conducting the reactions of this invention, it is preferred to mix thoroughly powdered aluminum with the powdered magnesium oxide. For example, an aluminum powder, 90% of which is finer than 325 mesh, and magnesium oxide powder having a particle diameter of about $1/10$ micron may be used. Although it is not essential, it is also preferred to press the mixture into a pellet or compact before firing. This results in an intimate contact between the magnesium oxide and the aluminum and provides a greater yield of product. The pellets may be either dry pressed or hot pressed. In either case, the use of a binder is not necessary. The pressure employed for dry pressing has little effect on the yield and quality of the magnesium oxide whiskers formed.

Hot pressed pellets can be formed in any conventional manner. According to one method, the aluminum-magnesium oxide mixture is pressed at 600° C. and 31,000 p.s.i. pressure, after a ten minute hold at 600° C., with no pressure, followed by a ten minute hold at 600° C. with the application of a pressure of 600 p.s.i. The size of the pellets used in the reaction is not critical and in practice will be dictated by the size of the furnace available. Larger hot pressed pellets may themselves be reduced to a powder and used in the reaction.

It has been found that a temperature of at least about 1300° C. initiates the formation of the magnesium metal vapors, with a temperature in the range of 1450° C. to 1600° C. being preferred. In practice, it is best to introduce the reaction mixture into a furnace which is preheated to the desired temperature. This enhances the yield and quality of the magnesium oxide whiskers which are formed. However, the reaction can proceed and an acceptable product can be obtained when the materials are introduced into a cold or only slightly heated furnace which is then brought to the reaction temperature.

Referring now to the drawing, a side cross-sectional view of an apparatus for carrying out the invention, it will be seen that the process may be conducted in a furnace 10 which comprises an elongated refractory tube 11 wound with a resistance heating coil 12. A removable sleeve or liner 13 is positioned within tube 11 to protect it from deterioration during the reaction. Tubes 11 and 13 may be of any suitable refractory material, such as alumina, and winding 12 may be of platinum.

Sleeve 13 is provided at one end with end closure 14 through which extends gas conduit 16. These elements also are of refractory materials capable of withstanding the high temperature at which the furnace is operated.

A valve 18 is associated with conduit 16 enabling gas from an external source (not shown) to be metered into tube 13.

Refractory plugs 15 and 17 effectively seal the end of sleeve 13 distant from gas conduit 16. These plugs are removable to permit introduction and removal of the reactants.

Resistance element 12 is energized by a source of electricity (not shown) to raise the temperature in furnace 10 to above 1300° C. and preferably above 1450° C.

The furnace is flushed with an inert gas, such as nitrogen or argon, admitted through valve 18 and conduit 16.

Powders of aluminum and magnesium oxide are mixed and dry pressed to form a self-supporting pellet 20 which is placed in a refractory boat 21. Plugs 15 and 17 are removed and the boat and pellet are placed in tube 13 of furnace 10. The plugs are replaced and the aluminum and magnesium oxide of pellet 20 are observed to react promptly as evidenced by a dense cloud of smoke.

After the smoke has cleared, it is seen that whiskers of the three general types previously described have been produced within the reactor.

Relatively large whiskers are grown from the surfaces of the furnace tube 13, from boat 21, from refractory plugs in the hot zone and from the pellet 20. The cotton-like mats grow on both the furnace tube 13 and boat 21. The fur mats of very fine fibers or whiskers generally grow only on the surface of the pellet.

The mats of fibers comprise a plurality of individual fibers overlayed upon one another in random arrangement with some surface bonding between adjacent fibers at their points of contact.

The whiskers produced in this manner were found by X-ray analysis to be composed of magnesium oxide. These fibers are highly resistant to hydration. After storage in air without protection from normal humidity, no degradation was evident under microscopic examination. The surfaces of the larger whiskers remain just as bright and highly reflective after several weeks of storage as they were immediately after production.

The smaller whiskers, about 1 micron in diameter or less, appear to have clean regular surfaces. The larger fibers, about 4 microns in diameter and above, show various amounts and types of secondary growth.

Although the preferred method for conducting the reaction comprises mixing powders of aluminum and magnesium oxide, the invention may be practiced in other ways. For example, a solid piece of aluminum may be placed against the surface of a body of magnesium oxide and then heated to reaction temperature. Magnesium oxide whiskers 50 are produced at the point of contact between an aluminum wire 51 and the surface of a magnesium oxide single crystal 52 when heated at 1560° C. for about one hour in a nitrogen atmosphere. Oxygen which "back-diffused" into the reaction chamber combines with the magnesium metal vapors to produce the magnesium oxide fibers.

The following specific examples may also be helpful in gaining a full understanding of the invention.

Example I

A mixture of equal parts of high purity aluminum powder (90% finer than 325 mesh) and "electronic grade" magnesium oxide powder ($\frac{1}{10}$ micron particle diameter) is dry pressed under sufficient pressure to form a self-supporting pellet capable of being handled. The pellet is introduced into a furnace which is flushed with nitrogen gas and is heated to a temperature of 1450° C. Small amounts of oxygen are permitted to "back-diffuse" into the furnace. After the evolution of smoke has ended, extensive whisker growth is observed in the furnace. X-ray analysis indicates that the whiskers are composed of magnesium oxide.

Example II

A mixture of equal parts of high purity aluminum powder (90% finer than 325 mesh) and "electronic grade" magnesium oxide powder ($\frac{1}{10}$ micron particle diameter) is heated at 600° C. for ten minutes, is pressed at 600° C. and 31,000 p.s.i. for ten minutes and is then pressed at 600° C. and 600 p.s.i. for ten minutes. The resulting pellet is placed in a furnace and is heated to about 1300° C. in an atmosphere of air. The whiskers produced in the furnace are composed of magnesium oxide.

Example III

The procedure of Example II is followed, but the hot pressed pellet is broken up into granules before firing. The entire charge is observed to react more quickly in the powdered form than in the form of a dense pellet.

Example IV

A mixture of two parts of comminuted aluminum and one part of comminuted magnesium oxide is thoroughly blended and hot pressed into a pellet. A furnace heated to a temperature of 1500° C. is flushed with nitrogen. Just prior to introducing the pellet, the nitrogen flow is discontinued. When the pellet is introduced into the furnace, air is permitted to enter along with it. There is an immediate formation of smoke and, after the smoke subsides, magnesium oxide whiskers are recovered.

Although the present invention has been described with reference to certain detailed examples and preferred embodiments, it will be understood that various changes and modifications may be made in the procedures and products without departing from the scope of the invention as defined in the following claims.

What is claimed is:
1. A method for producing magnesium oxide fibers comprising: reacting aluminum metal and magnesium oxide in substantially stoichiometric proportions at a tempera- ture of at least 1300° C. to reduce the magnesium oxide and to form vapors of magnesium metal and then reacting said vapors of magnesium metal with oxygen to form magnesium oxide fibers.

2. A method for producing magnesium oxide fibers comprising: heating a mixture of comminuted aluminum metal and comminuted magnesium oxide to a temperature of at least 1300° C. to react said aluminum and said magnesium oxide in substantially stoichiometric proportions, thereby forming vapors of magnesium metal and then reacting said vapors of magnesium metal with oxygen to form magnesium oxide fibers.

3. The method of claim 2 wherein said mixture is heated to a temperature of between 1450° C. and 1600° C.

4. A method for producing magnesium oxide fibers comprising: forming a mixture of comminuted aluminum metal and comminuted magnesium oxide, dry pressing said mixture to form a self-supporting compact, heating said compact in a substantially inert atmosphere to a temperature of at least about 1450° C. to react said aluminum and said magnesium oxide in substantially stoichiometric proportions, thereby forming vapors of magnesium metal and then reacting said vapors of magnesium metal with oxygen to form magnesium oxide fibers.

5. A method for producing magnesium oxide fibers comprising: forming a mixture of comminuted aluminum metal and comminuted magnesium oxide, hot pressing said mixture, heating said hot pressed mixture to a temperature of at least 1300° C. to react said aluminum and said magnesium oxide in substantially stoichiometric proportions, thereby forming vapors of magnesium metal and then reacting said vapors of magnesium metal with oxygen to form magnesium oxide fibers.

6. The method of claim 5 wherein said hot pressed mixture is heated to a temperature of between 1450° C. and 1600° C.

7. The method of claim 5 wherein said hot pressed mixture is heated in an oxygen-containing atmosphere.

8. The method of claim 5 wherein said hot pressed mixture is heated in a substantially inert atmosphere.

9. A method for producing magnesium oxide fibers comprising: forming a mixture of comminuted aluminum metal and a commminuted magnesium oxide, hot pressing said mixture to form a compact, comminuting said compact to form a powder, heating said powder to a temperature of at least 1300° C. in a substantially inert atmosphere to react said aluminum and said magnesium oxide in substantially stoichiometric proportions, thereby forming magnesium metal vapor and then reacting said vapor of magnesium metal with oxygen to form magnesium oxide fibers.

10. A method for producing magnesium oxide fibers comprising: heating to a temperature of at least 1300° C. in a chamber having an inert atmosphere, a mixture of comminuted aluminum metal and comminuted magnesium oxide, to react said aluminum and said magnesium oxide in substantially stoichiometric proportions, thereby forming vapors of magnesium metal and admitting an oxygen-containing gas into said chamber to react with said vapors of magnesium metal to form magnesium oxide fibers.

11. The method of claim 10 wherein said mixture of comminuted aluminum metal and comminuted magnesium oxide is in the form of a dry pressed pellet and the temperature is at least 1450° C.

12. The method of claim 10 wherein said mixture of comminuted aluminum metal and comminuted magnesium oxide is in the form of a hot pressed pellet.

References Cited

UNITED STATES PATENTS

| | | | |
|---|---|---|---|
| 1,450,464 | 4/1923 | Thomson | 23—294 |
| 2,454,733 | 11/1948 | Dahl | 23—201 |
| 3,147,085 | 9/1964 | Gatti | 23—294 X |

OSCAR R. VERTIZ, *Primary Examiner.*

G. T. OZAKI, *Assistant Examiner.*